US005497149A

United States Patent [19]

Fast

[11] Patent Number: 5,497,149
[45] Date of Patent: Mar. 5, 1996

[54] GLOBAL SECURITY SYSTEM

[76] Inventor: Ray Fast, 15515 - 111 A Avenue, Surrey, B.C., Canada, V3R 0J6

[21] Appl. No.: 392,026

[22] Filed: Feb. 21, 1995

Related U.S. Application Data

[63] Continuation of Ser. No. 116,077, Sep. 2, 1993, abandoned.

[51] Int. Cl.⁶ .................................................. G08G 1/123
[52] U.S. Cl. .......................... 340/988; 340/426; 342/457
[58] Field of Search ..................................... 340/988, 995, 340/574, 573, 539, 989, 426; 342/357, 457; 379/58, 59, 37, 38; 364/460, 499; 307/10.2

[56] References Cited

U.S. PATENT DOCUMENTS

| | | | |
|---|---|---|---|
| 4,651,157 | 3/1987 | Gray et al. | 342/450 |
| 4,750,197 | 6/1988 | Denekamp et al. | 379/59 |
| 5,003,317 | 3/1991 | Gray et al. | 342/457 |
| 5,053,768 | 10/1991 | Dix, Jr. | 340/988 |
| 5,115,223 | 5/1992 | Moody | 340/539 |
| 5,117,222 | 5/1992 | McCurdy et al. | 340/539 |
| 5,155,689 | 10/1992 | Wortham | 364/460 |
| 5,208,756 | 5/1993 | Song | 342/457 |
| 5,218,344 | 6/1993 | Ricketts | 340/539 |
| 5,223,844 | 6/1993 | Mansell et al. | 342/357 |
| 5,264,828 | 11/1993 | Meiksin et al. | 340/539 |
| 5,334,974 | 8/1994 | Simms et al. | 340/988 |

OTHER PUBLICATIONS

STS Avionic Products Brochure, ©1987.

Primary Examiner—Brent A. Swarthout
Attorney, Agent, or Firm—Paul F. Schenck

[57] ABSTRACT

A system for determining the position of an object to be protected using a local or global positioning system and issuing messages to a monitoring message center at predetermined times and/or at times when the object to be protected is under an alert condition, such as being outside an allowed position zone during a defined time period.

19 Claims, 5 Drawing Sheets

GLOBAL SECURITY SYSTEM

This application is a continuation of application Ser. No. 08/116,077 filed on Sep. 2, 1993, and now abandoned.

BACKGROUND OF THE INVENTION

The present invention relates to a systems for locating persons or objects at predetermined times and under predefined emergency situations in allowed and disallowed areas.

Recent incidences showed how easy it is to abduct a person, and how difficult it is to trace the whereabouts of an abducted person. In some of the incidences the abducted person was not even aware of being abducted until the person was already moved to a place far away from the location of abduction. There is often no possibility for the abducted person to give a warning.

At present there is no security system that can prevent well planned abductions. The lack of safeguards is significant in child care cases. Rather than providing increased security by severe restrictions of movement the device of the present invention improves security by determining the location of the person and matching the determined location with listed allowed locations. The allowed locations may be time dependent.

Locating systems presently used monitor the distance between the object device and a reference location device by monitoring the signals exchanged between the object device and the reference location device. As soon as the object comes closer to the reference point, or separates from the reference point by more than a predetermined space, an alarm is issued. Such a system provides for an alarm on/off situation but cannot assist in locating the object which is outside an allowed area.

The system of the present invention provides a method of protecting individuals by allowing them to "wear" a device that locates its own position independent of a monitoring terminal and will transmit that information to the monitoring terminal when activated. Activation of the device can be done manually, by pressing a button, or can happen automatically if the wearer is leaving a predefined zone. Anti-tampering circuitry is provided that activates if removal or destruction of the device is attempted.

The same technology can also be applied to detect theft of vehicles and other mobile or stationary valuable property. The fact that the protected person or item can be tracked will allow a rapid rescue or recovery.

Recent advances in navigation, communication, and computer technologies combined provide for the breakthrough. Existing infrastructures such as the navigation network, the mobile communications network, and emergency and security services are used.

Most homes and businesses today are protected by fairly elaborate security systems. The technologies include infrared and ultrasonic motion detectors and video surveillance systems. Some systems are wired to monitoring services or patrolled by guards for around-the-clock protection. These systems cost thousands of dollars to install and security services add more to the cost every month. New technologies are continually developed, however, crime is still increasing. The present invention overcomes these and other deficiencies in a new approach using global position information for locating a person or an object to be protected. In the following specification the device attached to the person or object to be protected is called a 'beacon' to underscore one of its most important functions: send out a message identifying itself and its position.

OBJECTS OF THE INVENTION

It is an object of the invention to provide for a security system in which the object to be observed carries a beacon of a positioning system.

It is another object of this invention to provide for a security system in which the location of an object is determined by the beacon attached to the object.

It is another object of the invention to provide for a security system in which the beacon attached to an object broadcasts its position based on inputs from a positioning system.

It is another object of this invention to provide for a security system in which the beacon attached to an object determines its position relative to allowed and forbidden areas.

It is another object of this invention to provide for a security system in which the beacon attached to the object issues alert signals if it determines to be in a disallowed area.

It is another object of this invention to provide for a security system in which the allowed and disallowed areas are defined to change with time.

It is another object of this invention to provide for a security system.

DESCRIPTION OF THE INVENTION

A The Person Protection System

The object protection system of the present invention comprises two major components: a security beacon and a programming/monitoring terminal. The security beacon, the beacon, contains a Global Positioning System (GPS) receiver. This receiver determines its own location from information it receives from satellites. The security beacon also contains a cellular telephone designed to transmit and receive data. The GPS receiver and the cellular data transceiver are both controlled by a microprocessor. Several anti-tampering circuits, a manually operated call button and an optional audible or vibration alarm devices can be contained within the beacon. All of these electronics are contained in a single compact enclosure and battery powered, preferably using rechargeable batteries. The enclosure is made of materials such as reinforced plastic and epoxy resin that are designed to allow electromagnetic radiation to pass yet provide a rugged and waterproof enclosure.

The security beacon is attached to a person and is fitted in such a way that it can not be removed except with a key. Various housing configurations allow it to be worn under clothing, clamped around an ankle, worn on the chest or back, and is secured by sever-resistant straps. It can also be worn on the shoulders surrounding the neck, because the neck opening is smaller than the person's head, so it can not be removed. A call button for initiating communication with the monitoring terminal can either be part of the beacon or it may be contained in a separate housing connected to the beacon.

There are three interconnect ports on the beacon; a battery charging terminal, a call button interface, and a programmer interface. Only the battery charging port is accessible while the beacon is locked onto the wearer or object.

The call button may be a separate unit that is connected via a tiny wire to the security beacon. It consists of a housing with a button which is shrouded to guard against accidental depressing. The call button unit may be combined with an LCD read-out screen and a vibrating silent alarm.

The monitoring/programming terminal is essentially a computer containing a telephone modem. The terminal is used for several functions:

to create and download programs into the security beacon, to allow supervising personnel to "answer" a call from the beacon and receive and display all information transmitted from the beacon, to monitor a phone line for information sent from the beacon, to create and send messages to the beacon, to call the beacon to request information, and to store a sequence of events during an emergency call and to retrieve diagnostic information from the beacon, to send control commands to the beacon, once it is activated, such as turn on alarm, microphones, redirect the call etc., to deactivate the beacon when the incident is over.

Zone programs are created in the terminal by displaying on the terminal screen a detailed local map and zooming in on the area of interest. Using cursor controls, a series of coordinates are defined which enclose a perimeter. The area inside the perimeter is a zone which can be named and stored in the terminal's memory. A zone can be defined as an allowed area or as a disallowed/forbidden area. A zone program can be downloaded to the beacon very quickly via the programmer interface.

In monitoring mode the terminal is connected to a telephone outlet and a normal phone. The phone can be used normally but it is desirable to have call waiting, call forward and conference call features on the subject phone line. These will ensure that a call from the beacon can be dealt with under all circumstances. The supervising personnel can alternately send a command to the beacon during an emergency call to cause the beacon to terminate its initial call and place another call to an alternate number such as 911.

The monitoring terminal will recognize a call from the beacon and, if unanswered, will forward the call. Generally the terminal will be set to 911 or a commercial security service number as the call forward destination. Any number can be chosen for beacon call forwarding. Telephone calls which are not originated by the beacon will be ignored by the terminal so these can be forwarded independently, using the regular telephone system.

The security beacon can be used in the following applications:

Protecting persons against violence and abduction;

Issue of warning notices if a person to be protected leaves a protected zone or enters a forbidden zone;

House arrest and restraining order enforcement.

The beacon to be worn by the person to be protected is to be programmed by connecting it to the monitoring/programming terminal. The personal data of the wearer are stored in the beacon memory. A series of zone programs are downloaded from the terminal. These zone programs contain data defining the areas in which the wearer may be and those areas which the wearer is not to enter. Zone programs may include time limited restraints. Once loaded, zone programs are maintained as long as the beacon batteries retain their charge or are being recharged.

Timing information can be correlated to each zone to define when the person may be in each zone. For child protection purposes a zone program such as "SCHOOL" will define the area in which the child is expected to be on weekdays for a period of time in the morning and again in the afternoon. "PLAYGROUND" might define where the child goes during the lunch break, in such a case a time period between 12:00 to 1:00 pm would be attached to the PLAYGROUND zone program. The area between home and the child's school, along the route normally traveled, would be invoked for an earlier period of time in the morning and again later in the afternoon. Zones and times may overlap to provide flexibility in the child's schedule. Forbidden zones may be dangerous areas located within an area in which the wearer normally would be allowed to be. A forbidden area may be a lake in a park through which the child may walk before and after school. If the message receiving option is used, a warning can be printed automatically from the beacon to its message screen, and/or one of the alarms used, to alert the wearer that a zone boundary had been violated. If the allowed zone is returned to within a specified time, an emergency transmission will be avoided In general, the zone programs are to be set-up for the regular daily living environment of the wearer. Zone programs differ from person to person and differ in their application of protecting, observing and restricting a person.

Once such a string of programs is loaded into the beacon, a multi-digit security code is loaded. This code will ensure that only the supervising person can access the beacon remotely. To ensure secrecy, the code may be changed any time the terminal is connected to the beacon. It should be known only to the person supervising the wearer of the beacon.

If use of the call button is desired, it must be connected to the beacon before locking it on to the wearer.

Once the preparations are completed the beacon can be disconnected from the terminal, fitted onto the wearer and locked in place. The call button unit is attached at a convenient and unsuspicious location to the skin or to clothing of the wearer. The terminal remains connected to the home phone line and is set to monitoring mode.

The prepared system is ready to provide security and supervision for the wearer on four different levels:

1) Emergency Call Button Activation

If the wearer perceives danger or requires emergency attention of any kind, a push of the call button activates the beacon which sends information to the monitoring terminal. The terminal produces a distinctive alarm tone indicating an emergency situation. When answered, the terminal begins to display several pieces of information, the most important of which is the wearer's identification and location. Other information may include the current time as well as the time at which the last accurate position of the wearer was known. When the emergency call button is operated the beacon immediately begins to determine its present location. It continuously updates and transmits this information to the terminal. It may also transmit any speed, elevation and direction in which the wearer is moving. The monitoring terminal has the ability to display the received position information as text coordinates and simultaneously as a spot on its on-screen map to provide user friendly information.

Receiving this information will allow the supervising personnel to plan an appropriate course of action to provide assistance for the wearer. A phone call to 911 or a commercial security service would get professional attention to the wearer as quickly as possible. The wearer's position information could be relayed to the authorities over the phone to allow them to locate and assist the wearer.

The call could alternately be forwarded to a mobile monitoring terminal which would allow the supervising personnel to drive to the assistance of the wearer while receiving updated position information.

A mobile terminal is the preferred primary terminal. It consists of a cellular phone, a global positioning system (GPS) receiver, and a computer with keypad to allow beacon programming. It can display on its screen a map layout, and it has the capability for automatic scaling of the map to display simultaneously its own position and the position of the beacon on the same map.

Automatic scaling of the displayed map and determination of the position of the mobile terminal on the map provides for easy tracking of a person or object wearing the beacon, even while the terminal and the beacon are moving. Automatic scaling and position determination of the mobile terminal and the beacon eliminate the need for interpretation of map coordinates and manual control of scaling and panning of the displayed map. Tracking of a security beacon with a mobile terminal can be as accurate as absolute positioning is using differential GPS. If both the beacon and the mobile terminal use the same GPS receiver, they will both receive and interpret the same signals of the GPS with the same inaccuracies and error parameters. A mobile terminal can therefore track to, at worst, 10 meters from the beacon without requiring differential GPS.

Differential GPS is based on the idea that if a GPS receiver is in a known, fixed location, it can calculate the inaccuracy with which the GPS signal is received. Because the GPS satellites are so high up, the inaccuracy of all receivers in a fairly large area will be nearly the same. The differential fixed receiver can thus transmit a message to all other receivers in the area telling them what correction factor to use to improve their accuracy. There are a large number of differential GPS stations in North-America. Most differential signals are transmitted along with commercial radio station signals. If the tracked beacon is equipped with an additional signal generator, such as an audible, ultrasonic or radio frequency signal generator the signal generator can be activated from the mobile terminal to enable the searching person to positively identify the beacon at short distance.

Using the beacon call button, it will be possible to encode the emergency call for various circumstances. A single push of the button may send a "general emergency" signal, while pushing the button more than once in sequence could be linked to a "medical emergency". At the terminal, operators can distinguish between different types of emergencies and take appropriate action.

The terminal of the system can also be programmed to automatically direct a call from the beacon to 911 or a commercial security service if the call to the supervising personnel is unanswered, the line is busy, or even under all circumstances. This will require that the security service have monitoring terminals connected to their phone lines and/or have mobile terminals.

2) Automatic emergency call if abducted

The personal security beacon determines its location periodically while in use. It switches from a periodic mode to a continuous mode when an emergency status is activated, e.g. by operating the emergency button or leaving an allowed zone, or tampering with any one of the built-in safety features. If the beacon finds its location to be outside an allowed zone, designated by the corresponding time, it will automatically perform a routine to verify its location. If a zone violation is confirmed, the beacon will activate itself to emergency status, transmitting position information to the monitoring terminal. It may be programmed to alert the wearer first and allow the wearer to return to the required or allowed zone, thus avoiding activation of an emergency status. The warning is printed to the call button's message screen and the vibrating alarm and/or audible alarm is activated to alert the wearer.

This automatic mode of activation provides protection in case a wearer is unable to operate the call button. Such a situation may arise due to various circumstances such as:

1) The abductor forcibly prevents the wearer from using the call button.

2) The wearer is lured into abduction, rather than forced, and so does not consider it an emergency situation.

3) The wearer becomes lost or disoriented and wanders out of the allowed zone.

4) The wearer does not fully understand use of the call button so the supervising personnel chooses not to attach it to the beacon.

The beacon will also be automatically activated to emergency status if it detects tampering such as: Force applied to the locking mechanism, severing of the retaining straps, attempted removal from the user, or damage to the call button or its interconnecting wires.

Consideration and definition of allowable zones and corresponding times has to be done with care because if the wearer strays from the allowed zone the beacon will automatically call the terminal. Under certain circumstances it can be advantageous to rely solely on activation by the call button.

Once activated, the beacon remains in emergency mode until the correct action is taken to deactivate the emergency status.

3) Message receiver

The call button unit or the beacon itself can be equipped with an LCD screen option for displaying short messages from the terminal. The supervising personnel can compose messages using the terminal and then call the beacon using its call number. Transmission of a message may be secured by a multi digit security code. If so, the supervising personnel must enter the code matching the one most recently programmed into the beacon. The message received by the beacon will be displayed on the call button unit's LCD screen. A vibrating indicator silently may alert the wearer to the incoming message. Display of a message may be time limited.

Supervising personnel can use this feature to send the wearer messages such as: CALL HOME, COME HOME NOW, etc.

Direct communication from the beacon to the terminal can be disallowed or may not be available on some configurations to prevent the possibility of an abductor forcing the wearer to issue an "all is well" message.

4) Position polling

Any time supervising personnel is curious or concerned as to the whereabouts of the wearer, a call can be placed from the terminal to the beacon to poll it for location information. This is done by typing, on the terminal, the beacon's call number followed by the current multi digit security code and a position request command. The beacon will respond by transmitting its current position information to the terminal. There is no indication to the wearer that position information has been requested. Position information from the beacon will be accurate enough to find the vicinity of the wearer within less than 100 meters.

B Other Applications

Police and security officers may wear a personal security beacon so that assistance can be called instantly, whenever it is required, without accessing their communication radios and describing their location. This is especially useful if the person is "on the move", if silence is required, or the person is injured or is about to lose consciousness.

The Person Protector System can be used to assist law enforcement officials in providing protection to other persons. A personal security beacon can be locked to a threatened person. The key may be kept by the officials. The corresponding terminal would also be monitored by the officials. Call button activation would generally be used to report danger, however, a series of zone programs could be used if abduction or kidnapping of the protected person is suspected.

In these cases battery recharging will be required while the beacon is being worn because the wearer will be unable to remove it. The beacon detects when charging is taking place, and is programmable for a particular battery charging schedule. If charging does not take place when required, the beacon will automatically transmit that information to the monitoring terminal. Activation will also occur any time a low battery charge condition is detected. With this information provided by the beacon, and use of the position polling feature available, any violation or malfunction can be detected remotely, by the authorities, and dealt with accordingly.

Enforcement of house arrest and restraining order enforcement could be handled with the system of the present invention much more accurately than present systems provide. The ankle-bracelet type electronic beacons presently used in house-arrest cases detect only that the ankle bracelet is in the vicinity of the assigned receiver beacon. These ankle-bracelet beacons provide virtually no means for tracking the wearer outside the range of the assigned receiver beacon. The present invention provides for means for defining allowable zones, and times during which an allowable zone may be occupied, zones disallowed at all times, as well as recharge schedules. This information is programmed into the beacon by law enforcement officials. The beacon is then locked to the person and monitored by the officials.

Enforcement of restraining orders relating to maintaining a set distance between two persons can be done in two ways assuming both the persons are equipped with appropriate equipment.

1) The person or object to be protected has an encoding signal transmitter. The person under restraining order wears a beacon with an additional receiver tuned to and enabled to decode the signal generated by the protective transmitter. Any time the person under restraining order comes within range of the protective transmitter, the beacon is activated and appropriate action can be taken by the supervising person at the alarm receiving terminal.

2) Both the threatened person and the threatening person are required to wear a beacon of the present invention. A terminal for monitoring each beacon would be maintained by a supervising authority. Each beacon would be programmed to "phone" the other beacon at alternating intervals and request its position. If the positions of the two beacons were found to be too close together, a warning message would be sent to each wearer indicating that a potential violation had occurred. If greater separation distance was not provided within a predetermined time limit, both beacons would be triggered into emergency mode allowing the supervising authority to track one or both the parties.

C Object Protection System

Technology similar to the Person Protector System can be used to detect, as well as to trace or track, stolen vehicles without the need to chase them.

The Object Protector System consists of two elements, a security beacon and a Remote Control. Monitoring terminal and call button unit are optional.

The beacon is attached to the object, e.g. a motor vehicle, in a secure and hidden location. The Remote Control is kept by the owner or operator and consists of a tiny, low power, signal transmitter with a multi button keypad. The transmitted signal may be a radio signal, an acoustical signal, or an optical signal.

Required programming for the security beacon is minimal and can be done by interconnecting it to the remote control via an interface cable. Programming can be accomplished also via a monitoring/programming terminal.

Automatic Activation if Stolen:

When for example the motor vehicle is parked, the beacon automatically stores its location in memory. Before the vehicle is moved the beacon must receive a transmitted signal containing a preprogrammed security code. The code is transmitted by pushing the correct sequence of buttons on the Remote Control.

The security code can be changed, as often as desired, by interconnecting the security beacon and the remote control via the interface cable. Beacon programming is done via direct connection, rather than transmission, to prevent reception of the code by unauthorized persons.

While the vehicle is parked, the beacon periodically determines and records its position. If the vehicle is started, without having received the security code transmission, it will automatically activate to emergency status. If the vehicle is moved, even without being started, the beacon will also become activated.

When activated, the beacon will call a preprogrammed phone number such as 911 or a commercial security service. When the call is answered the beacon will first transmit a "stolen vehicle" message, including the license plate number, and the owner's name and phone number. It will then begin transmitting the vehicle's position, speed and direction of travel. This information will be continuously updated and transmitted until the vehicle is recovered. The beacon can only be deactivated when it receives the required security code transmission.

This system will allow law enforcement officials to track the stolen vehicle, even while it is moving, and identify it by its license plate. It is not necessary to have the stolen vehicle in sight, however, to keep track of it. The terminal receiving position information from the stolen vehicle can either be at a fixed base station, with position information relayed to the tracking vehicle by radio, or a mobile terminal can be carried in the tracking vehicle. Using this system, it can be prevented that the unauthorized user of the vehicle recognizes a car following at a distance, thus a high speed chase can be avoided. The stolen vehicle can be quickly apprehended by the authorities when it reaches a presumably safe area or comes to a stop.

When it is recovered, the vehicle's owner can be called to deactivate the beacon with the remote control. The owner may alternately select a secondary security code which would be kept on file with the police or security company. This code could be used by the authorities to deactivate temporarily the beacon. For added security, however, this secondary code would only be accepted by the beacon via the interface cable.

Call Button Activation:

A call button unit can be connected to the vehicle security beacon. To prevent detection by thieves, the unit would either be permanently mounted in a hidden but accessible location or disconnected and removed when the vehicle is not in use. This button will allow the driver to activate the beacon to emergency status in the event of a car-jacking, an accident or any other emergency situation. This configuration might be especially desirable for police cars and public taxis and transit vehicles such as busses.

A home monitoring terminal is not required for the vehicle Protector System, however, if one is installed it could be used to poll the vehicle for its position information at any time, as well as to send messages to the call button message screen, if so equipped.

The security beacon is powered by the vehicle battery for normal operation. It has a built in battery, however, for emergency mode operation. Unless the beacon is deactivated, it will detect any disconnection of the vehicle battery. It can be programmed to consider this an emergency situation and become activated to emergency mode.

For protecting stationary objects the beacon can be locked on to, or built into, any valuable objects such as; works of art, furniture, machinery, electronic components, instruments, etc. An allowed location or zone can be programmed in to each beacon. The beacon checks its location periodically and if it ever finds itself outside its allowed zone it activates to emergency mode. Position and velocity information transmitted from the beacon will allow the property to be recovered by the owner or security officers. When recovered it must be deactivated using a key or, alternately, an electronic deactivation code.

This system will work best on instruments or machinery which are normally connected to household power because a battery charging system could be built in. To protect objects that are not electrically powered, a battery recharger would have to be connected periodically or long life batteries used and replaced as necessary. Alternatively, an external power supply could be connected discretely to such objects to provide operating power for normal mode and to keep a battery charged for emergency mode.

For objects that are meant to remain fixed, and an external power supply is not practical, a passive motion detection beacon, such as a tremble switch, would be interconnected to the beacon and used in place of or in combination with the emergency button unit. Position checking would not be done by the beacon unless motion was suspected due to momentary contact of the tremble switch. Suspected motion would initiate a position verification routine by the beacon which would activate to emergency mode if a violation of the allowed position were discovered.

In most cases it will be undesirable to have the beacon visible on the object. In some cases, such as use on animals which might stray from their allowed zones, however, visibility might be an advantage in terms of a deterrent to theft or recognition of the animal by its rescuers.

D Safeguard Systems

The beacons have several mechanisms and algorithms to safeguard against malfunctions or attempts to sabotage the systems or undermine their effectiveness.

As described earlier, several circuits, designed to detect attempts to remove or destroy the personal security beacon, are built into it. The locking mechanism and any retaining straps have two safeguards: strain gauges to detect undue force, and circuit continuity detection to detect severing.

The call button unit is monitored by the security beacon microprocessor. The wire interconnecting the button unit with the beacon is very thin so that it can be easily hidden inside clothing. This also allows it to be easily broken, even during a struggle, as a method of beacon activation. Internally, the connection to this circuit is fused to prevent a short circuit or any applied voltage from damaging other circuitry. Attempting such damage would only result in activation of the emergency function of the beacon.

The battery charging port on the personal security beacon is accessible even while the beacon is locked on to the user. This makes it a target for access to the internal electronics for the purpose of sabotage. For this reason the port has a voltage monitor controlling a circuit breaker. If the correct charging voltage is presented, the processor will recognize it and thus allow the beacon to follow a preprogrammed charging schedule. It will also recognize if too high a voltage, a short circuit or reversed voltage is connected to the port, and will disconnect the port and activate the beacon to emergency mode.

Two individual batteries are contained in the personal security beacon to provide a safety margin. One is for power supply in normal operating mode and the other is mainly for emergency mode power. If the primary battery for normal operation becomes discharged, this information can be transmitted to the monitoring terminal and/or displayed on the call button message screen. At this point normal operating activity will be reduced to conserve battery power in case emergency mode operation is required. It may be preferable to use a non-rechargeable battery for the emergency mode back-up power supply.

To allow continuous use of the personal security beacon, the battery charger will have sufficient capacity to simultaneously power the personal security beacon and charge its batteries. The monitoring terminal will also have battery back-up capability so that loss of household power will not render the system useless. Call button activation of a security beacon will have highest priority and must override any other microprocessor activity, such as position checking or message receiving, in the beacon. An incoming message from a beacon to the monitoring terminal will have highest priority and will override any other activity the terminal's processor might be involved in.

If a beacon is activated to emergency mode it will immediately attempt to establish a communication channel to the monitoring terminal. It will continue attempts to call the terminal until it is either successful or all battery power is drained. Attempts will get progressively less frequent in order to prolong battery life. Even when a communication channel is established it may become disconnected. If this happens, the beacon will again continue attempts to reconnect until it is either successful or out of all battery power.

At the moment when a beacon is activated it will store, in its memory, the current state of all its parameters such as: latest location, time of latest location, time of activation, activation method, any activation code used, current location, any unsuccessful communication channel attempts, etc. After a communication link to the terminal is established, a sequence of events will automatically be stored in a designated segment of the terminal's memory. The terminal can later be used to retrieve the diagnostic information stored in the beacon. This is done by interconnecting the terminal and the beacon via the programming port. In this way the information from the beacon can be combined with that in the terminal and used to reconstruct the entire event. This information can be a valuable tool to help solve the crime.

ALTERNATE TECHNOLOGIES

The Global Positioning System receiver in the beacon could be replaced by a navigation system based on LORAN or the Russian satellite based positioning system called GLONASS. It could also be enhanced by more accurate positioning systems like Differential GPS which would require an additional receiver to be added to the beacon. This would improve the absolute positioning accuracy of the systems from a worst case of 100 meters to about 10 meters.

The cellular network data transceiver in the security beacon and/or mobile terminal could be replaced or enhanced by another mobile communications system data transceiver unit such as UHF radio or a Mobile Satellite communications system. Digital cellular may simplify the transmission of data and may provide more efficient use of the cellular frequency spectrum. A "low speed cellular data channel" is in general all that is required for the security system to communicate. This is usually less expensive than a voice channel. A voice channel may be desirable, however, for the following features:

1) A microphone can be installed in the beacon. It could be activated from the monitoring terminal, using the multi-digit security code, and thus allow the supervising personnel to listen to what is going on at the beacon wearer's location. This may assist in making decisions as to how best to provide assistance. To prevent unwanted eavesdropping the microphone could not be activated unless the beacon was in emergency mode.

2) The security beacon could contain a voice synthesizer to communicate all required information verbally rather than in data form. Position information would be in the form of verbal map coordinates. If the emergency call was not answered via a monitoring terminal, the verbal mode would be activated. This would allow the system user to forward calls from the beacon to any phone. The beacon could contain a dual-tone multi-frequency (DTMF) decoder to receive messages and/or commands from a touch tone telephone.

The key to lock and unlock the personal security beacon could be replaced by alternate locking systems such as an electronic or mechanical combination lock or a magnetically encoded lock.

A keypad to program a security beacon could be built in to any of the beacons so that they would not need to be connected to a terminal for programming.

For some applications it may be considered an enhancement to house the personal security beacon in, or disguise it as, an article of clothing or jewelry such as a belt, wrist band, wrist watch, boot, jacket, brazier, etc.

The vehicle protector system could be integrated into a complete navigation/communication/entertainment/instrumentation system by vehicle manufacturers, rather than be installed independently in existing vehicles.

The vehicle security beacon may be interconnected to various conventional vehicle alarm systems. This would allow the beacon to be activated before the vehicle was started or moved.

The key chain remote control need not be a radio transmitter. It may be some other type of transmitter such as infrared or ultrasonic. A key pad could alternately be wired into the vehicle itself and could be combined with the door locking mechanism.

The mobile monitoring terminal may contain its own GPS or differential GPS receiver. This would allow the positions of both the tracking terminal and the security beacon that is being tracked to be displayed on the terminal's screen simultaneously. This will significantly reduce the complexity of tracking a security beacon, which may involve driving through unknown territory while trying to read the map and operate the terminal's controls to scroll the map display.

Operation of Beacon

When answered, the terminal begins to display several pieces of information, the most important of which is the wearer's name and location. Other information includes the current time as well as the time at which the last accurate position of the wearer was known. When the emergency call button is operated the beacon immediately begins to determine its present location. It continuously updates and transmits this information to the terminal along with the speed and direction, if any, at which the wearer is moving.

In case the beacon is sending information to a monitoring service where the wearer of the beacon is unknown, additional personal information may be transmitted to the monitoring terminal if these data are stored in the beacon. Such personal data may include age, sex, address, medical data, telephone number of a relative, etc.

Range Extension

Due to the nature of GPS signals they do not penetrate buildings very well. Mobile communication networks on the other hand are designed to provide service inside and outdoors. However, mobile communication networks are not always reliable, especially in places such as underground parking lots. For the wearer of a beacon of the present invention inside a building it means reduced capability to exchange data with the monitoring terminal and reduced capability or total incapability to provide a fix on the current position. The beacon may provide the last valid position but no further update when being moved inside a large construction with no access to a GPS signal.

To reduce the possibility of such an occurrence, low power transmitters/repeaters may be installed inside the construction to either repeat an outside GPS signal or to provide for a GPS substitute signal. The beacon of the present invention may switch to the stronger one of the two signals: the GPS signal or the local GPS substitute signal. If installed in a moving vehicle the local GPS substitute signal generator may even provide for current position of the vehicle. And it may include circuitry for supporting communication between the beacon of the present invention and the monitoring terminal.

Figure 1:
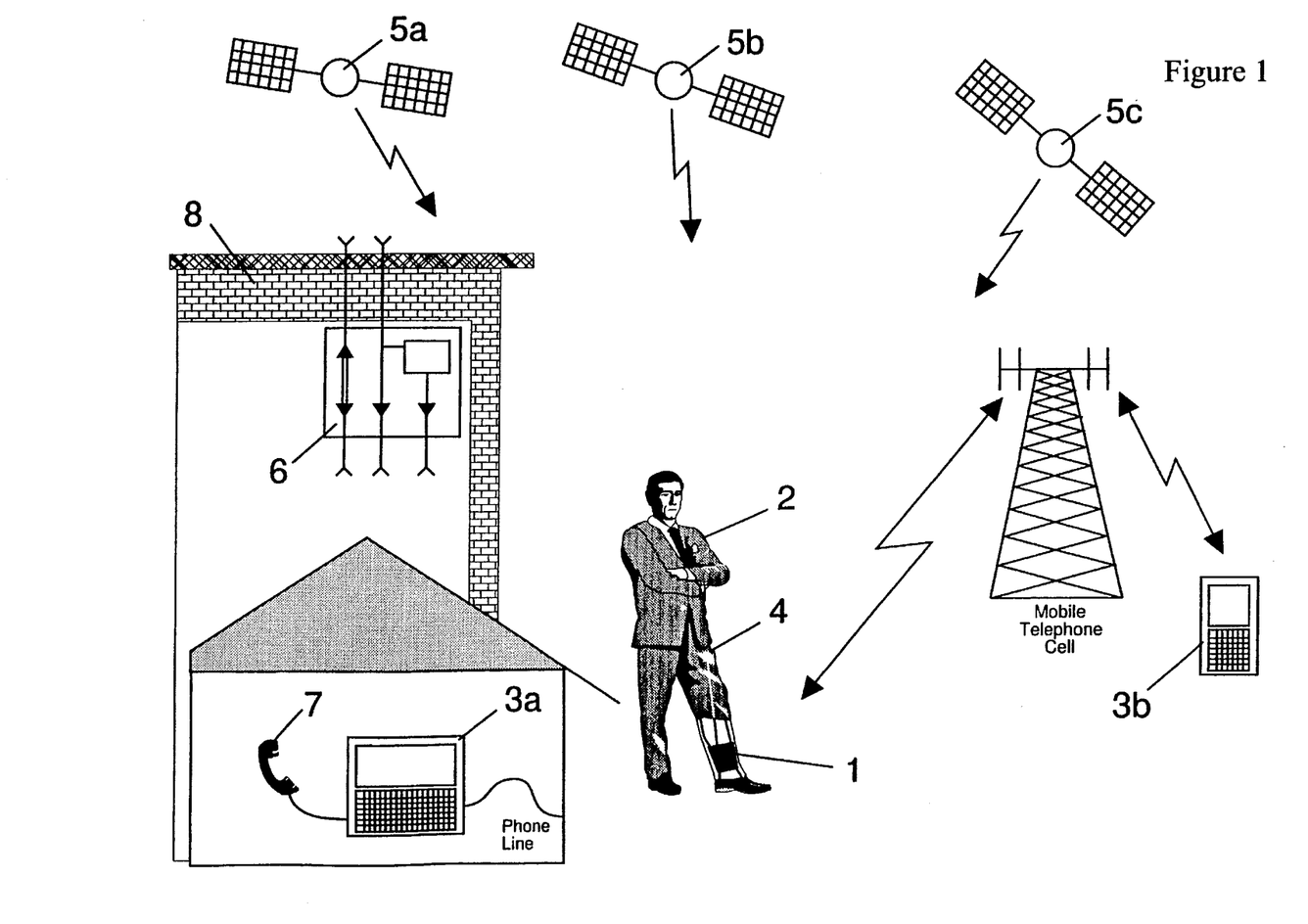
FIG. 1 is a schematic illustration of the components of the global security system.
Figure 5:
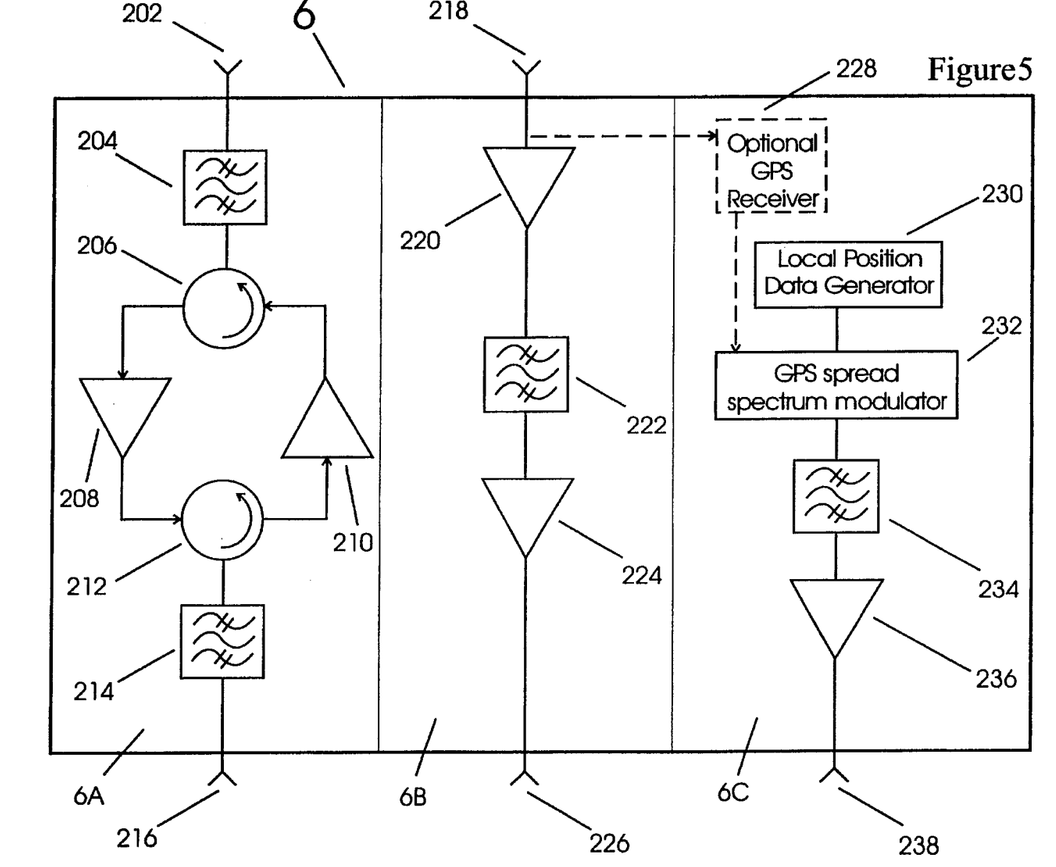
FIG. 5 is a block diagram of an arrangement for using the present invention in an otherwise communicationwise inaccessible construction.

The use of local GPS substitute generators and repeaters for communication between the beacon of the present invention and the monitoring terminal is illustrated in FIG. 1 as item 6. FIG. 5 is a block diagram of a repeater. Such an arrangement would make the particular construction transparent to the communication system of the present invention.

The GPS substitute signal will be received by the beacon with the same circuitry that is used for real GPS signals. The substitute signal transmitter will transmit data containing it's fixed location. The beacon will receive this data in the same way it receives ephemeris data from GPS satellites.

DESCRIPTION OF THE PREFERRED EMBODIMENT

FIG. 1 is a schematic illustration of the components of the global security system. The security system includes the security beacon 1, which is attached to the object 2 to be monitored and a monitoring/programming terminal, which can be stationary 3a or mobile 3b. (In the following disclosure the monitoring/programming terminal is referenced as terminal 3, unless there is a specific difference between a stationary terminal 3a and a mobile terminal 3b.) Communication between beacon 1 and a terminal 3 is wireless via a cellular network or similar communication means. The beacon 1 may include a manually operable call button 4 or other means for initiating an emergency call, such as medical emergency monitoring sensors, or tampering detection sensors.

The beacon includes receivers for signals from any global positioning satellites, such as satellites 5a, 5b, and 5c. These received signals are used by beacon 1 to determine the present position of the beacon. Beacon 1 will determine periodically or, if activated, continuously its position. It will transmit the determined position to terminal 3 whenever polled by terminal 3 or continuously if activated. Terminal 3 will issue an alert when a transmission from the beacon is received. If a terminal is unanswered by supervising personnel, it may be programmed to forward the call. Such a programmed call forward may establish a connection by telephone with other supervising personnel or a 911 emergency station. If object 2 is within a construction which reduces or eliminates the ability of beacon 1 to receive GPS signals or communicate with terminal 3, range extender 6 provides a GPS substitute signal and/or a repeater station for cellular and/or GPS signals.

Figure 2:
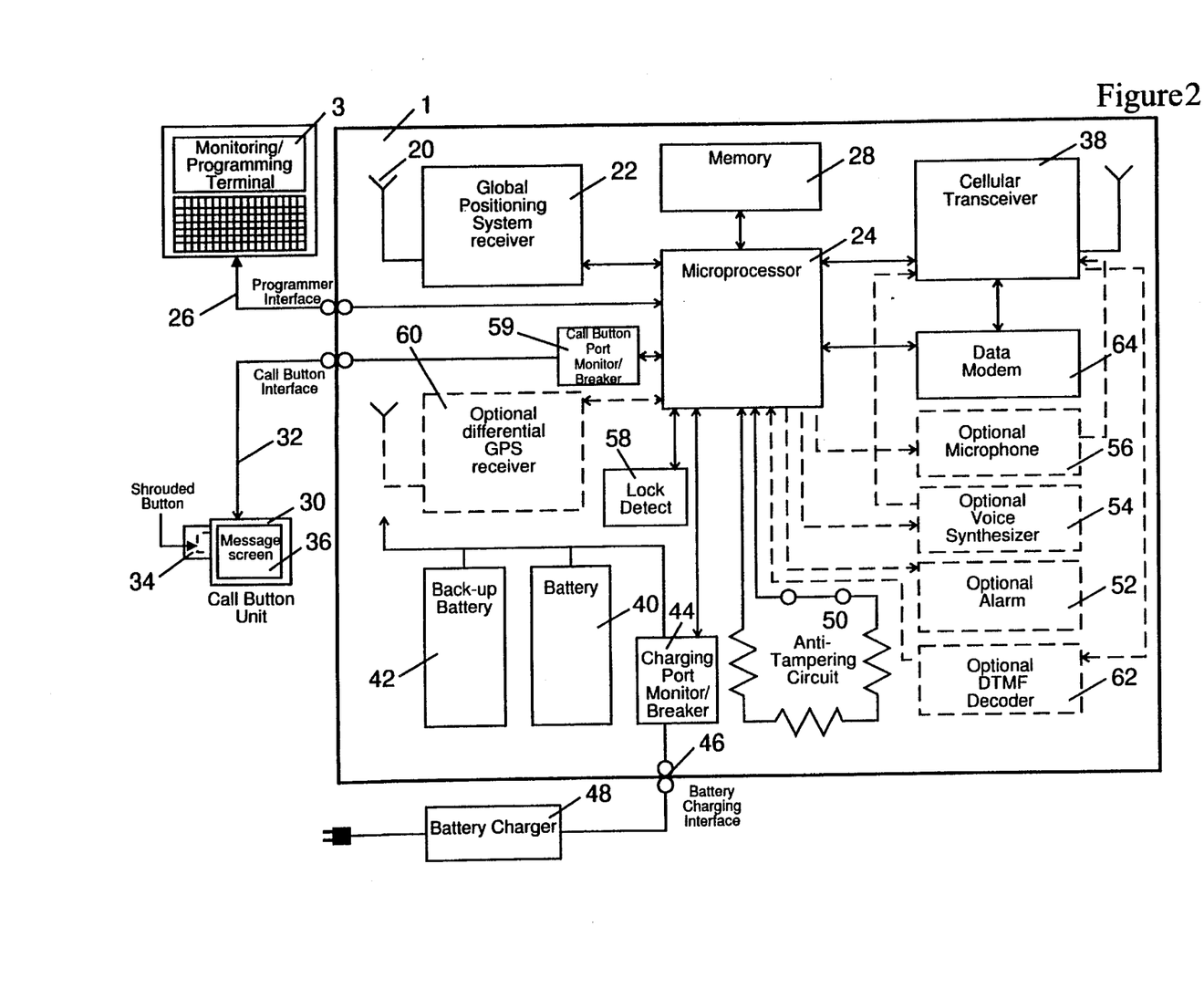
FIG. 2 is a schematic illustration of the functional components of the security beacon.

FIG. 2 is a schematic illustration of the functional components of the security beacon. The security beacon 1 receives signals from navigation transmitters, such as global position satellites or LORAN system transmitters via antenna 20 and receiver 22. The received signals are fed to microprocessor 24 for determining the actual position, and whether the determined position is inside or outside an allowed area. Commercially available GPS receiver modules are made by Rockwell International under the name NavCore® V, and by Trimble Navigation Ltd under the name SVeeSix, and others.

Allowed areas and disallowed areas and any timing restraints related to these areas are downloaded from a terminal 3 into beacon 1 via a cable 26 and stored by microprocessor 24 in memory 28. A call button unit 30 is connected to security beacon 1 by cable 32. Call button unit 30 includes a call button 34 and may optionally include a message screen 36. Call button unit 30 communicates with microprocessor 24. In operational use any information to be forwarded by beacon 1 to a terminal 3 is transmitted via cellular transmitter 38 or under limited stationary conditions via line 26.

Beacon 1 includes at least one battery 40 as power supply during stand-alone operation. A second battery 42 may be included for back-up conditions and for use during transmissions when power requirements are high. A charging port 46 allows charging of batteries 40 and 42. Charging port 46 includes special features to ensure proper use and operation of beacon 1. Monitor/breaker 44 will cause an alert via microprocessor 24 if a voltage is applied to terminal 46, and if this voltage is larger or smaller than or otherwise differs from the expected charging voltage from an authorized charging unit 48. If a proper voltage is applied to terminal 46 microprocessor 24 will check the present time with the expected time for charging batteries 40 and 42, in the same manner microprocessor 24 checks at the expected time for charging whether charging takes place. A timewise deviation of the expected charging operation from the actual charging operation can be reported by microprocessor 24 to terminal 3.

When protecting stationary objects such as works of art, etc., the beacon may be wired to a power supply via a network, thereby using battery power only in case of a power failure or an emergency situation. The wired connection may not be a galvanic connection but could be a transformer coupled connection for power transmission.

Other alarm initiating features include anti-tampering circuit 50 which monitors any restraining straps and strain gauges with which beacon 1 is attached to the object and lock detect circuit 58 which determines if the lock is activated by the correct key. Micro-processor 24 also senses any interruption or change of conductivity between call button unit 30 and beacon 1 through call button port monitor 59.

To adapt beacon 1 to specific applications it may be equipped with an audible or inaudible alarm 52. A voice synthesizer 54 may be used to communicate verbally from a beacon 1 to any telephone. Communication from a touch tone phone to the beacon can be done using DTMF tones if decoder 62 is incorporated. An optional microphone 56 in the beacon 1 can be activated from terminal 3 to listen to an emergency situation. To prevent eavesdropping the beacon would normally not allow activation of a built-in or attached microphone except if the beacon has been activated to emergency mode. A beacon 1 equipped with a microphone 56, or voice synthesizer 54, or DTMF decoder 62 will require access to a voice grade cellular channel instead of a data-only channel.

Differential GPS receiver 60 may be included in applications where more accurate absolute positioning is required.

Figure 3:
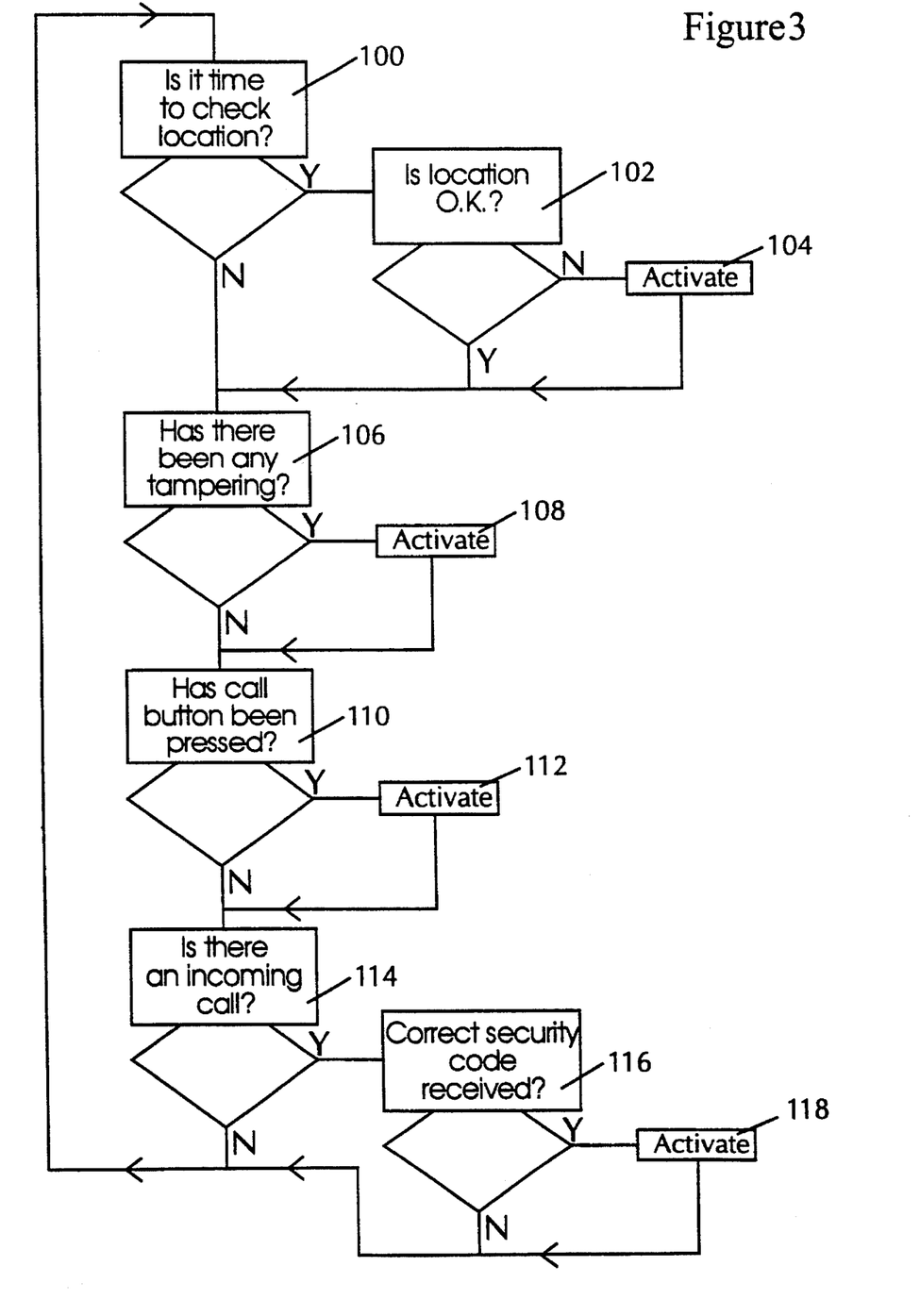
FIG. 3 is a flowchart depicting the operational cycle of the security beacon.

FIG. 3 is a flowchart depicting the basic operational cycle of the security beacon. At certain times or periodically microprocessor 24 will initiate a location check 100 and determine if the position is within an allowed zone for the present time 102. Emergency type activation 104 occurs if the actual position is outside an area allowed for the present time. The initiated cycle continues with checking anti-tampering circuits 106, and emergency type activation 108 occurs if tampering is detected. Actuation of a call button is interrogated next 110 and emergency activation initiated if necessary 112. A hardware interrupt is used to ensure that activation of the call button overrides any non-emergency activity the microprocessor might be involved in. The initiated cycle ends with checking for an incoming call 114 which may have been issued by terminal 3. Establishing a communication channel not initiated by the beacon is represented step 116. Non-emergency activation occurs 118 if the correct security code is received 116.

As indicated in the description of the invention there are a large number of applications for the object security beacon, and every application may require additional steps in the basic operational cycle of the beacon. The operational cycle can be modified by downloading modifying and/or additional cycle controlling instructions from a terminal 3 to beacon 1. The use of microprocessor 24 in conjunction with memory 28 provides for adaptation of beacon 1 to the particular security task.

Figure 4:
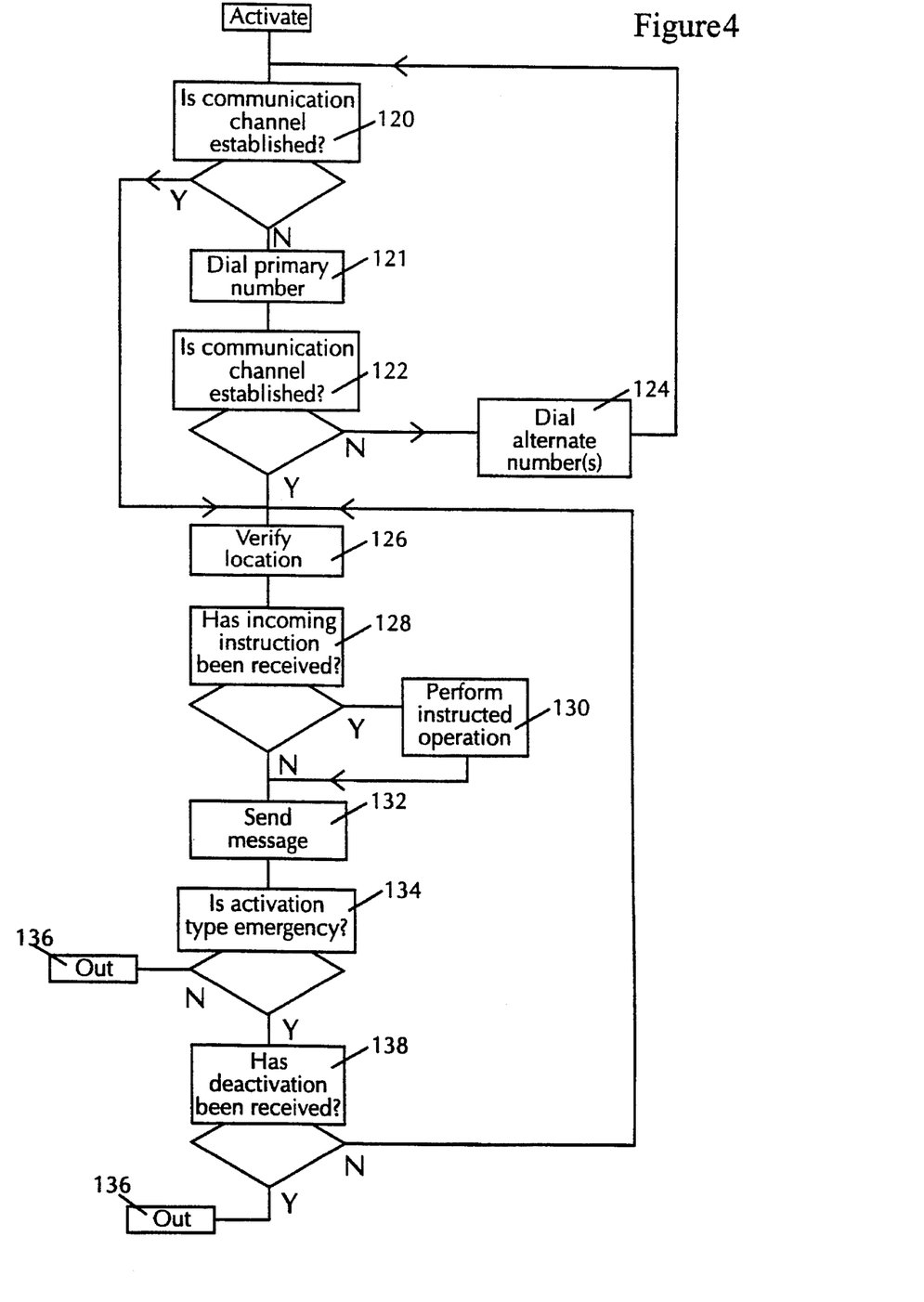
FIG. 4 is a flowchart depicting the generational cycle of the beacon in active mode.

FIG. 4 is a flowchart depicting the operation of beacon 1 once activated. Activation starts with initiating a communication link 120, unless a communication channel has been established from terminal 3. A medical alert may be reported to a different destination than a report regarding exiting an allowed zone. Microprocessor 24 dials the number stored in memory 28 as the primary number 121, then checks whether a connection is made 122 and selects an alternate communication path if needed 124.

As soon as a link is established beacon 1 verifies its location 126. Microprocessor 24 then checks to see if any incoming instruction has been received 128. If so, microprocessor 24 performs the instructed operation 130 and sends a message 132 confirming that the operation was done or supplies the requested information. Incoming instructions could be any of the following:

position request message to screen sound silent alarm sound audible alarm turn microphone on activate anything programmed into the beacon by the terminal disconnect communication channel and call other number activate voice synthesizer and/or DTMF decoder provide additional identification and information about the object to which the beacon is attached.

If no incoming instruction was received 128, the message 132 will be the position information along with identification of the object or person to which the beacon is attached.

If activation type is not emergency 134 the activated mode is exited 136 and the normal operational cycle is returned. If activation type is emergency 134 microprocessor 24 checks to see if a deactivation code has been received 138 indicating an end to the emergency situation 136. Until this order is received the message sending cycle is repeated with continuously updated position information.

FIG. 5 is a block diagram of range extender 6 of FIG. 1. The range extender 6 may contain any or all of sections 6A, 6B, and 6C. Section 6A is cellular band, 2-way repeater including a transmit/receive antenna 202 which is connected to bandpass filter 204 which attenuates all signals outside of the cellular frequency band. Circulator 206 passes incoming signals to amplifier 208 and outgoing signals from amplifier 210 to filter 204. Circulator 212 passes incoming signals from amplifier 208 to filter 214 and outgoing signals from filter 214 to amplifier 210. Antenna 216 transmits incoming signals and receives outgoing signals.

Section 6B is a GPS frequency band repeater. It receives incoming GPS signals using antenna 218 and amplifies the GPS signal in amplifier 220. Band pass filter 222 attenuates all signals outside the GPS frequency band. Signals in the GPS band are amplified by amplifier 224 and transmitted via antenna 226.

Section 6C is a GPS substitute signal generator. It can either have its position programmed into a local position data generator 230 or it can determine its own position using GPS receiver 228. Local position data generator 230 continuously repeats a location signal which is modulated by modulator 232 onto a GPS frequency carrier. The carrier is filtered by bandpass filter 234 to ensure that no spurious signals are transmitted. It is then amplified by amplifier 236 and transmitted via antenna 238. Beacon 1 will receive the location code using a single channel of multichannel GPS receiver 22. The remaining channels will continue to search for GPS timing signals. If real GPS signals are found to be strong enough to decode, microprocessor 24 will recognize this and use the GPS signals for a more accurate position determination.

The global security system of the present invention provides for a new approach to protecting persons and objects. It provides for an improved enforcement of restraining orders, including alerting capability if a person under restraining order comes close to the person under protection. The capability to dynamically change areas from allowed areas to disallowed areas and vice versa for a person improves protection without undue restriction of movement.

What is claimed is:

1. A security system for protecting and locating an object, and for alerting supervising personnel responsible for said object, said security system determining the geographic position of said object using position signals transmitted by a geographic positioning system, comprising a terminal, and an object beacon;

said object beacon including a geographic position determining device attached to said object including a microprocessor and a memory for storing programs to be executed by said microprocessor, first receiving means for receiving said position signals from transmitters of said geographic positioning system, a wireless communication port connected to a receiver and a transmitter for transmitting alert messages and receiving first data, said first data including confirmation data and deactivation data, a wired connection port for transferring said programs and second data from said terminal to said memory;

said second data including allowed geographic position data defining at least one allowed geographical area for said object predetermined by said supervising personnel and defining all areas outside said at least one allowed geographical area as disallowed geographical areas for said object, and data identifying said object to be protected; said second data remaining unmodified when said terminal is not connected to said wired connection port;

said programs including a first program for determining an actual geographic position of said object using said position signals received by said first receiving means and supplied to said microprocessor, a second program including a first subprogram for comparing said so determined actual geographic position with said allowed geographic position data and generating a first alert message if said actual position does not match said allowed position data, said second program repeating said alert message until said receiver receives said deactivation data;

a first timer for periodically executing said first program, a second timer for repetitively executing said second program;

said terminal for generating said programs and transferring said programs via said wired connection port of said object beacon to said memory, and for receiving said alert messages via said wireless communication port, said terminal being locally independent of said object beacon when monitoring said geographic position determining device and including means for generating and transmitting messages to said supervising personnel upon receiving an alert message from said object beacon.

2. A security system for protecting and locating an object, and for alerting personnel responsible for said object, as claimed in claim 1 wherein said position signals are received from global position satellites.

3. A security system for protecting and locating an object, and for alerting personnel responsible for said object, as claimed in claim 1, wherein said position signals are received from LORAN or GLONASS position transmitters.

4. A security system for protecting and locating an object, and for alerting personnel responsible for said object, as claimed in claim 1, wherein said object is a person.

5. A security system for protecting and locating an object, and for alerting personnel responsible for said object, as claimed in claim 1, wherein said second data include data defining a plurality of allowed zones for said object.

6. A security system for protecting and locating an object, and for alerting personnel responsible for said object, as claimed in claim 1, wherein said second data include data defining a plurality of allowed geographical areas for said object and at least one disallowed area inside at least one of said allowed geographical areas.

7. A security system for protecting and locating an object, and for alerting personnel responsible for said object, as claimed in claim 1, wherein said second data include data defining a plurality of temporary allowed geographical areas for said object and timing data defining times of allowance for said temporary allowed geographical areas.

8. A security system for protecting and locating an object, and for alerting personnel responsible for said object, as claimed in claim 1, wherein said second data include data defining a plurality of temporary allowed geographical areas and disallowed areas for said object and timing data defining times of allowance and disallowance for said temporary geographical areas.

9. A security system for protecting and locating an object, and for alerting personnel responsible for said object, as claimed in claim 1, wherein said object beacon further includes a second receiving means for receiving position signals from a local transmitter of a global positioning system; and wherein said position determining device uses said second receiving means if said first receiving means does not provide said position signals.

10. A security system for protecting and locating an object, and for alerting personnel responsible for said object, as claimed in claim 1, said object beacon further comprising power supply means including a battery and a recharge terminal for recharging said battery with a charge voltage of a predetermined type and voltage, and sensing means for determining type and voltage of an applied voltage and issuing an alert signal if said applied voltage is not of said predetermined type and voltage;

said second program further including a second subprogram for generating a second alert message if said sensing means issues said alert signal.

11. A security system for protecting and locating an object, and for alerting personnel responsible for said object, as claimed in claim 1, said object beacon further including an alarm terminal and an alarm button connected to said alarm terminal, said alarm terminal issuing a first alarm signal if said alarm button is operated, and a second alarm signal if said connection between said alarm terminal and said alarm button is interrupted;

said second program further including a subprogram for generating a third alert message if said alarm button is operated.

12. A security system for protecting and locating an object, and for alerting personnel responsible for said object, as claimed in claim 1, said object beacon further including a tamper-proof lock for attaching said device to said object, said lock issuing a third alarm signal if said lock is defective, said second program further including a subprogram for generating a fourth alert message if said lock issues said third alarm signal.

13. A security system for protecting and locating an object, and for alerting personnel responsible for said object, as claimed in claim 1, said object beacon being attached to said object by mechanical fastening means, said object beacon further including an anti-tampering circuit for checking integrity of said mechanical fastening means.

14. A security system for protecting and locating an object, and for alerting personnel responsible for said object, as claimed in claim 13, wherein said mechanical fastening means include electrical sensing means for indicating changes in conductivity, said anti-tampering circuit issuing an alert signal if said electrical sensing means indicate a change in conductivity of said mechanical fastening means.

15. A security system for protecting and locating an object, and for alerting personnel responsible for said object, as claimed in claim 1, said object beacon further includes an audible alarm device activatable by said micro-processor upon receiving a command included in said first data or executing one of said stored programs.

16. A security system for protecting and locating an object, and for alerting personnel responsible for said object, as claimed in claim 1, wherein said object beacon further includes a voice synthesizer for providing acoustical messages of said stored programs to be transmitted via said wireless communication port.

17. A security system for protecting and locating an object, and for alerting personnel responsible for said object, as claimed in claim 1, said object beacon further includes a microphone for collecting audible information, said microphone being activatable by said micro-processor upon receiving a command included in said first data or executing one of said stored programs, said collected audible information being processed by said micro-processor under control of one of said stored programs.

18. A security system for protecting and locating an object, and for alerting personnel responsible for said object, as claimed in claim 1, said object beacon further includes a microphone for collecting audible information, said microphone being activatable by said micro-processor upon receiving a command included in said first data or executing one of said stored programs, said collected information being transmitted via said wireless communication port.

19. A security system for protecting and locating an object, and for alerting personnel responsible for said object, as claimed in claim 1, said object beacon further includes an alphanumeric message display for displaying information, said information being provided by said micro-processor upon receiving a command included in said first data or executing one of said stored programs.

* * * * *